United States Patent [19]

Rao et al.

[11] Patent Number: 4,910,102

[45] Date of Patent: Mar. 20, 1990

[54] PROCESS AND APPARATUS FOR OPERATING A DEFERRED ACTUATED BATTERY

[75] Inventors: Bhaskara M. L. Rao, Flemington, N.J.; Wojciech Halliop, Kingston, Canada

[73] Assignee: Alupower, Inc., Warren, N.J.

[21] Appl. No.: 330,436

[22] Filed: Mar. 30, 1989

[51] Int. Cl.⁴ .............................................. H01M 6/48
[52] U.S. Cl. ....................................... 429/51; 429/67; 429/118; 429/210
[58] Field of Search ....................... 429/50, 51, 67, 72, 429/112, 113, 118, 119, 188, 210

[56] References Cited

U.S. PATENT DOCUMENTS

| | | | |
|---|---|---|---|
| 3,432,350 | 3/1969 | Wilson | 429/119 |
| 3,462,309 | 8/1969 | Wilson | 429/119 |
| 3,966,497 | 6/1976 | Honer | 429/119 |
| 4,091,184 | 5/1978 | Erisman et al. | 429/210 X |
| 4,152,492 | 5/1979 | McCartney et al. | 429/118 X |
| 4,185,143 | 1/1980 | Birt et al. | 429/119 |
| 4,626,481 | 12/1986 | Wilson | 429/210 X |
| 4,731,305 | 3/1988 | Goebel et al. | 429/210 X |
| 4,822,698 | 4/1989 | Jackowitz et al. | 429/118 X |

*Primary Examiner*—Anthony Skapars
*Attorney, Agent, or Firm*—Louis E. Marn

[57] ABSTRACT

There is disclosed an improved battery assembly and process for operating same wherein a battery assembly comprised of bipolar electrodes disposed between an inert cathode current collector acting as a hydrogen electrode and an anode plate formed of a material selected from the group consisting of aluminum, magnesium, aluminum alloys, magnesium alloys and mixtures thereof is configured for electrolyte flow wherein the electrolyte includes hydrogen peroxide in an amount to provide 0.5 to about 30 volume percent solution.

14 Claims, 2 Drawing Sheets

4,910,102

PROCESS AND APPARATUS FOR OPERATING A DEFERRED ACTUATED BATTERY

BACKGROUND OF THE INVENTION (1) Field of the Invention

This invention relates to deferred actuated batteries, and more particularly to a novel process and apparatus for operating an improved deferred actuated battery to enhance power density.

(2) Description of the Prior Art

Battery requirements for marine data systems vary from a few milliwatts for CMOS instrumentation to several tens of kilowatts for the operation of a mini autonomous underwater vehicle (AUV). Nonaqueous lithium cells and zinc-based primary cells, as well as nickel-cadmium and lead-acid batteries, are currently used. Safety and the corrosive nature of the electrolyte and/or some cathode materials used in such power sources dictate that cells and batteries be well sealed to prevent leakage and/or rupture during storage and use. Lithium batteries use hermetic seals with safety vents and a fuse. Alkaline cells are rendered leakproof by suitable double crimp joints. Lead-acid cells use a gelled electrolyte to prevent spillage of the electrolyte. Such techniques have minimized the hazards of handling and use, however at the expense of the costs. Sealed cells require a "pressure hull" enclosure for deep sea application and thus use of a pressure hull significantly reduces energy density and concomitantly increases usage cost. Other types of power cells used in undersea applications are water activated magnesium batteries with a bipolar configuration as open cells. A magnesium anode and a metal halide-based cathode allows the use of sea water as the electrolyte and do not require a pressure hull housing for deep sea applications.

Deferred actuated batteries, such as silver chloride-magnesium batteries using sea water as an electrolyte have been used for years, and are expensive being based upon the use of a precious metal, i.e. silver. Subsequent developments centered on non-silver containing sea water actuated batteries, e.g. U.S. Pat. Nos. 3,462,309 to Wilson based upon a magnesium anode-inert metal cathode type of a serial flow type configuration provided limited usages as well as extensive electrical circuitry including tunnel diode inverters to provide useful voltage levels. In U.S. Pat. No. 4,185,143 to Brit et al., there is disclosed a water actuated battery based upon metal-/organo halogen couples having anode and cathode members of planar form with a porous insulating member sandwiched therebetween where the cell is provided with electrolyte access passageways extending around the periphery of the cathode member whereby electrolyte flowing in the passageway access the whole peripheral edge region of the cathode reactant material.

In copending application Ser. No. 330,414, assigned to the same assignee as the present invention, there is disclosed a deferred actuated battery assembly comprised of a plurality of bipolar electrodes disposed between an inert cathode current collector acting as a hydrogen electrode and an anode plate formed of a material selected from the group consisting of aluminum, magnesium, aluminum alloys, magnesium alloys and mixtures thereof and configured for electrolyte flow therebetween. While such battery assembly has provided in a battery system improved capacity, longer shelf life, etc., there is always the desire to improve any such battery system, particularly current density.

OBJECTS OF THE PRESENT INVENTION

An object of the present invention is to provide a novel process and apparatus for operating an improved deferred actuated battery to enhance the power density thereof.

Another object of the present invention is to provide a novel process and apparatus for operating in a facile manner an improved deferred actuated battery.

SUMMARY OF THE INVENTION

These and other objects of the present invention are achieved by a novel process and apparatus for operating a deferred actuated battery assembly comprised of a plurality of bipolar electrodes disposed between an inert cathode current collector acting as a hydrogen electrode and an anode plate formed of a material selected from the group consisting of aluminum, magnesium, aluminum alloys, magnesium alloys and mixtures thereof and configured for hydrogen peroxide-containing electrolyte flow.

BRIEF DESCRIPTION OF THE DRAWINGS

Further objects and advantages of the present invention will become apparent from the following detailed description when taken with the accompanying drawing, wherein.

DETAILED DESCRIPTION OF THE INVENTION

Figure 1:
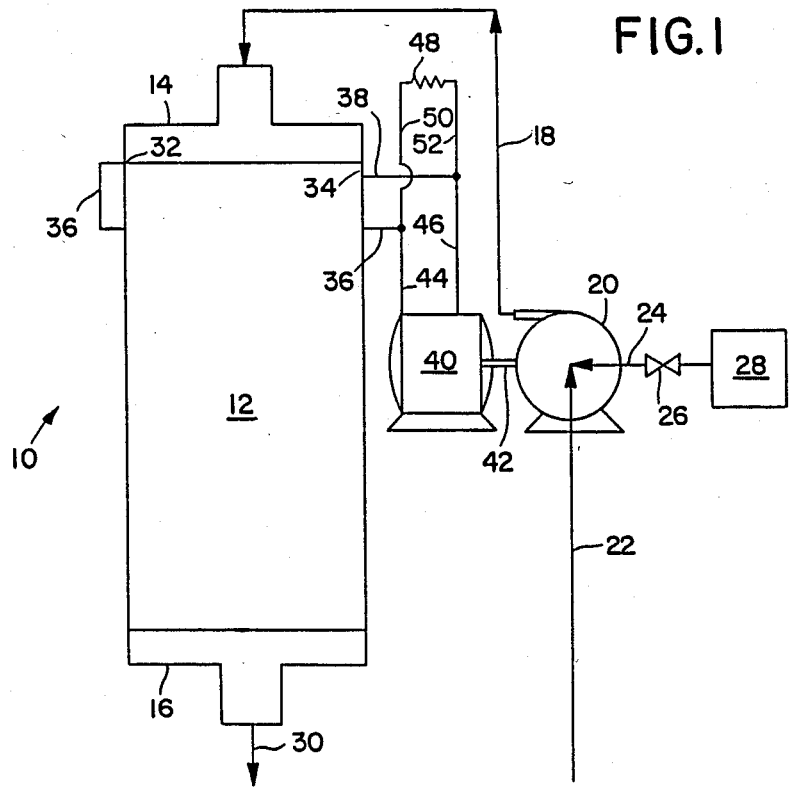
FIG. 1 is a schematic flow diagram of the process and apparatus of the present invention.

Referring now to the drawings and particularly FIGS. 1, there is schematically illustrated an integral battery assembly system of the present invention, generally indicated as 10 including a battery assembly 12, a fluid distribution manifold assembly 14 and a fluid collection manifold assembly 16 providing for electrolyte fluid flow through the spaces of the battery 10, as more fully hereinafter described. The distribution manifold assembly 14 is in fluid flow communication via line 18 with a pump 20 connected on a suction side by line 22 with a source of an electrolyte, such as sea water. Also connected by a line 24 under the control of valve 26 to the suction side of the pump 20, there is provided a hydrogen peroxide storage tank 28, as more fully hereinafter described. The manifold assemblies 14 and 16 provide for uniform fluid flow through the battery 10 and the collection and discharge of electrolyte via line 30.

Anode and cathode plates 32 and 34 of the battery 10 are connected by conductors 36 and 38 to a motor 40 including a shaft 42 via conductors 44 and 46 for driving the pump 20 and to a load 48 via lines 50 and 52, respectively. Thus, the integral battery assembly system of FIG. 1 may be packaged for subsequent use and activation by the addition of an electrolyte into the battery assembly 10 and accompanying fluid lines of the pump 20 as well as related conduits.

Figure 2:
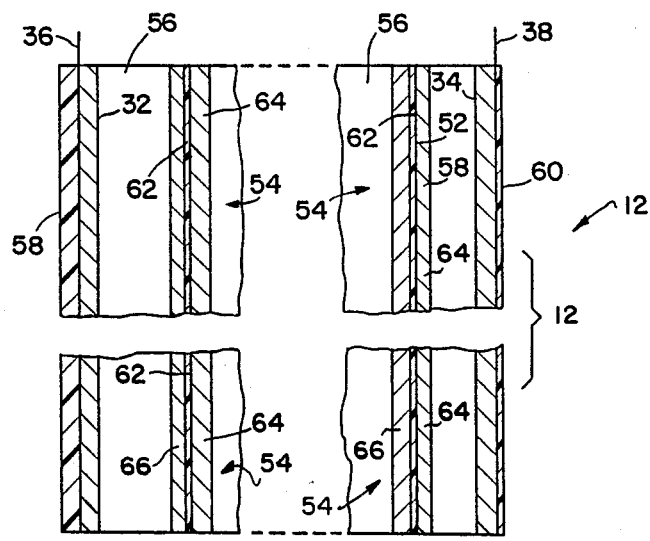
FIG. 2 is an enlarged partial cross-sectional view of a battery assembly.

As disclosed in the aforementioned copending application Ser. No. 330,414 the battery assembly 12, referring now to FIG. 2, is comprised of a plurality of bipolar electrodes 54 disposed between the anode plate 32 and the inert cathode current collector plate 34 and held in spaced-apart relationship by side walls 54 formed of a dielectric material, such as any conventional plastic material suitable for battery usage. Generally, spacing between adjacent bipolar electrodes 54 and the plates is not greater than about 0.5 inches to provide an adequate internally-connected series configuration. There being no top and bottom wall member, the battery assembly 12 permits the introduction as well as flow-through of an electrolyte from top to bottom, or alternately from bottom-to-top, etc. The anode and cathode plates 32 and 34 are coated on an outer surface thereof with a dielectric material, such as that of the side walls 56 forming anode end wall 58 and cathode end wall 60. The anode plate 32 and cathode plate 34 are provided with conductors 36 and 38 for connection to a suitable user article or assembly as hereinabove discussed.

Each bipolar electrode 54, referring again to FIG. 2, is comprised of electrically conductive laminating film or layer 62 laminated between an electronegative sheet or film of material 64 and an electropositive sheet or film of material 66. The electrically conductive laminating film or layer 58 is formed of a suitable plastic material, such as butyl or acrylic films of less than about 5 mils thickness. The butyl or acrylic film or layer 62 is formed with a dispersion of electrically conductive particles (not shown) in an amount sufficient to provide a volume resistivity of less than about 0.5 ohm cm. Such electrically conductive particles are exemplified by silver coated nickel particles of a particle size distribution of from 0.1 to 25 μm.

In operation, an electrolyte, such as sea water in line 22 is admixed with hydrogen peroxide in line 24 from the storage tank 28 in an amount to provide a hydrogen peroxide-containing electrolyte in line 18 of from about 0.05 to 30 volume percent hydrogen peroxide, preferably about 0.1 to 10 volume percent. The hydrogen peroxide-containing electrolyte is introduced via line 18 into the battery 12 via the distribution manifold 14 to place the battery assembly 12 into an operational mode may be continuously or intermittently passed through the battery assembly with hydrogen peroxide being continuously or intermittently introduced or added from storage tank 28 by line 24 under the control of valve 26 to the electrolyte in line 22.

Figure 3:
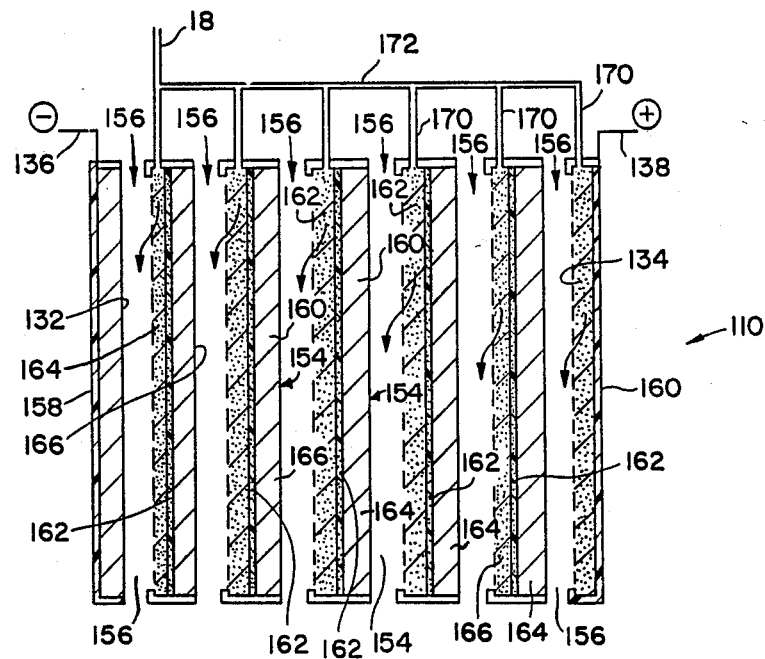
FIG. 3 is a schematic cross-sectional view of a battery assembly illustrating a flow through type configuration.

Referring now to FIG. 3, there is illustrated another embodiment of a battery assembly, generally indicated as 110, comprised of a plurality of bipolar electrodes 154 disposed between an anode plate 132 and a porous cathode current collector plate 134 and held in spaced-apart relationship by side walls 156 formed of a suitable dielectric material. The anode and porous cathode plates 132 and 134 are coated on an outer surface thereof with a dielectric material, such as that of the side wall 160. The anode plate 132 and porous cathode plate 124 are provided with conductors 136 and 138 for connection to a suitable user article or assembly.

Each bipolar electrode 154 is comprised of electrically conductive laminating film or layer 162 laminated between an electronegative sheet or film of material 164 and a porous cathode layer 166. The anode plate 114 and electronegative layer 164 are formed of like materials as the anode plate 32 and anode layer 64 of battery assembly system 10 described with reference to the embodiment of FIGS. 1 and 2. The porous cathode plate 134 and porous cathode layers 166 permit the fluid flow of the hydrogen peroxide-containing electrolyte in lines 170 to a conduit 172 in fluid flow communication to line 18.

EXAMPLES OF THE INVENTION

Operation of the process and apparatus is described in the following specific examples which are intended to be merely illustrative and the present invention is not to be regarded as limited thereto.

EXAMPLE I

Figure 4:
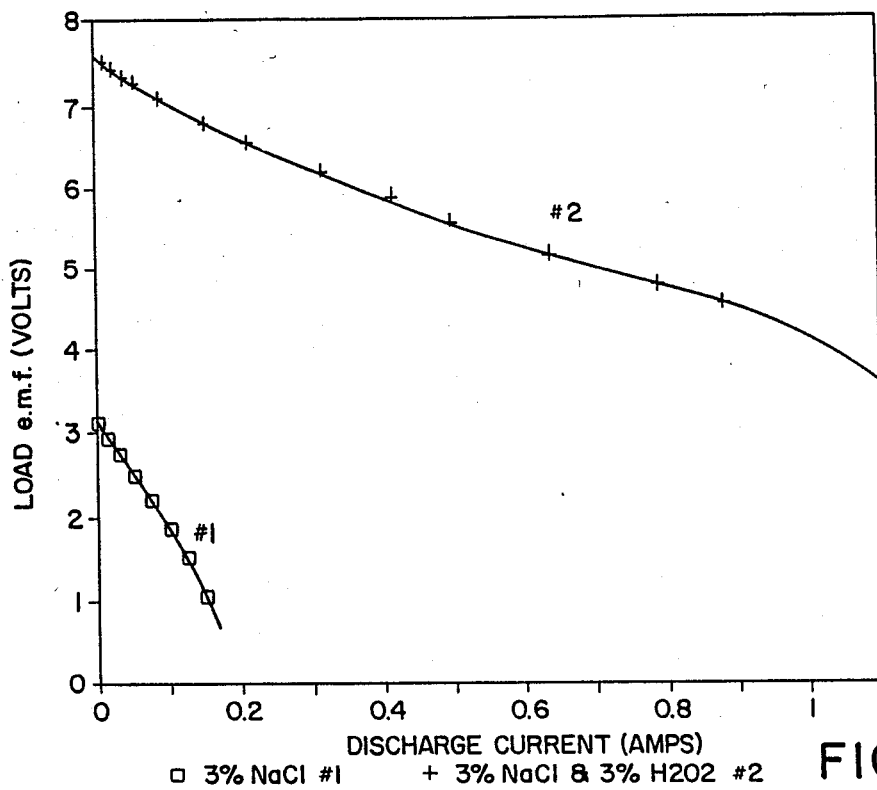
FIG. 4 are comparison curves of current vs. voltage.

To a battery assembly (6 V) comprised of a plurality of 0.025" bipolar electrodes of a 0.022" aluminum anode laminated to a 0.001" nickel foil treated with a dilute solution platinum-palladium chloride, there is passed an electrolyte (3% NaCl) alone (Curve #1), and in admixture with 3 volume percent hydrogen peroxide (Curve #2) with the results illustrated in FIG. 4 under conditions of one pass flow.

EXAMPLE II

Figure 5:
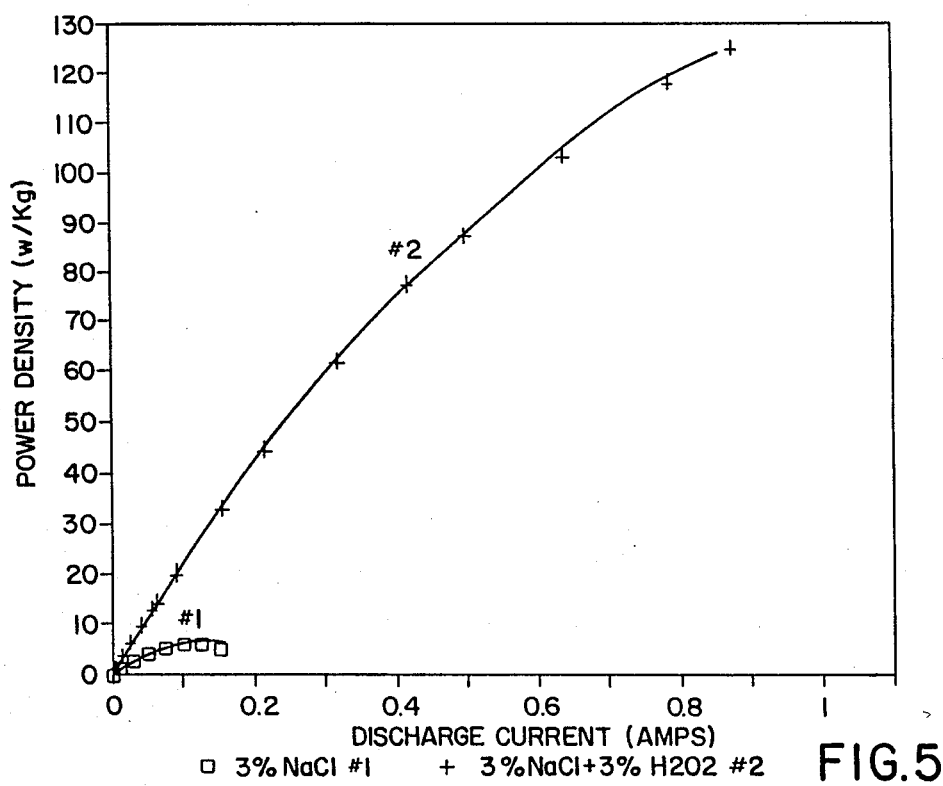
FIG. 5 are comparison curves of current vs. power densities.

To the battery assembly of Example I, there is passed a 3% percent NaCl electrolyte solution (Curve #1) and a 3 percent NaCl with 3 volume percent hydrogen peroxide illustrating power density as a function of discharge current referring to FIG. 5.

Hydrogen peroxide efficiency is more effective in the embodiment of FIG. 3, i.e. flow of the hydrogen peroxide-containing electrolyte through the porous cathode and cathode layers as distinguished from the flow of the hydrogen peroxide-containing electrolyte by the electrodes of the embodiment of FIGS. 1 and 2.

The battery assembly of the present invention is well suited for a variety of civilian (off-shore technology, commercial and recreational boating and fishing) and military marine applications. For example, the battery can be used as an electric power source for sonobuoys or other remote warning, sensing, monitoring and data transmission and repeater devices, for operating untethered diver assist equipment, such as lighting, cameras, electrical tools and the like. Larger versions of battery assembly may be used for electrical propulsion of underwater vehicles.

While the present invention has been described in connection with exemplary embodiments thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed is:

1. A battery assembly system, which comprises:
   a battery assembly comprised of an anode plate formed of a material selected from the group consisting of aluminum, magnesium, aluminum alloys, magnesium alloys and mixtures thereof; an inert cathode current collector plate functioning as a hydrogen electrode and a plurality of spaced-apart bipolar electrodes disposed between and spaced-apart from said anode plate and said inert cathode plates, each of said bipolar electrodes including an anode layer formed of a material selected from aluminum, magnesium, aluminum alloys, magnesium alloys and mixtures thereof and an inert cathode current collector layer functioning as a hydrogen electrode and laminated to said anode layer;

means for introducing hydrogen peroxide into an electrolyte; and means for passing a hydrogen peroxide-containing electrolyte through said battery assembly.

2. The battery assembly system as defined in claim 1 wherein said means for passing said hydrogen peroxide-containing electrolyte through said battery assembly includes a pump.

3. The battery assembly as defined in claim 2 wherein said pump is driven by a motor connected to said battery assembly.

4. The battery assembly system as defined in claim 1 wherein an open end of said battery assembly is provided with a manifold for introducing said hydrogen peroxide-containing electrolyte into said battery assembly.

5. The battery assembly system as defined in claim 4 wherein another end of said battery assembly is provided with a manifold to ensure uniform flow of hydrogen peroxide-containing electrolyte through said battery assembly.

6. The battery assembly system as defined in claim 1 wherein said bipolar electrodes of said battery assembly are spaced-apart a distance of less than about 0.5 inches.

7. The battery assembly system as defined in claim 1 wherein said anode layer and cathode layer of said bipolar electrodes of said battery assembly are laminated to a conductive layer having a volume resistivity of at least 0.5 ohm cm.

8. The battery assembly system as defined in claim 7 wherein said volume resistivity of said conductive layer is not greater than about 100 ohm cm.

9. The battery assembly system as defined in claim 1 wherein said anode plate, said bipolar electrodes and said cathode plate of said battery assembly are held in spaced-apart relationship by side walls defining passages therebetween for flow of said hydrogen peroxide-containing electrolyte.

10. A process for operating a battery assembly comprised of an anode plate formed of a material selected from the group consisting of aluminum, magnesium, aluminum alloys, magnesium alloys and mixtures thereof; an inert cathode current collector plate functioning as a hydrogen electrode and a plurality of spaced-apart bipolar electrodes disposed between and spaced-apart from said anode plate and said inert cathode plates, each of said bipolar electrodes including an anode layer formed of a material selected from aluminum, magnesium, aluminum alloys, magnesium alloys and mixtures thereof and an inert cathode current collector layer functioning as a hydrogen electrode and laminated to said anode layer wherein an electrolyte is passed through the battery assembly, the improvement comprising introducing hydrogen peroxide into said electrolyte.

11. The process for operating a battery assembly as defined in claim 10 wherein hydrogen peroxide is added to said electrolyte to provide a hydrogen peroxide-containing electrolyte having 0.05 to 30 volume percent hydrogen peroxide.

12. The process for operating a battery assembly as defined in claim 11 wherein said hydrogen peroxide is preferably of from 0.1 to 10 volume percent of said hydrogen peroxide-containing electrolyte.

13. The process for operating a battery assembly a defined in claim 10 wherein said hydrogen peroxide-containing electrolyte is passed by said electrodes.

14. The process for operating a battery assembly as defined in claim 10 wherein said hydrogen peroxide-containing electrolyte is introduced through said cathode layer of said bipolar electrodes of said battery assembly.

* * * * *